[19] United States Patent
Hadler et al.

[11] 4,415,043
[45] Nov. 15, 1983

[54] TOOLBAR WITH WINGS FOLDABLE SUBSTANTIALLY 180 DEGREES

[75] Inventors: Howard D. Hadler, Kewanee; James R. Kreftmeyer, Naperville, both of Ill.

[73] Assignee: Chromalloy American Corporation, St. Louis, Mo.

[21] Appl. No.: 307,372

[22] Filed: Oct. 1, 1981

[51] Int. Cl.³ ............................................ A01B 73/00
[52] U.S. Cl. .................................. 172/776; 172/311; 172/662
[58] Field of Search ............... 172/311, 446, 456, 662, 172/776; 56/228, 385; 16/365, 366, 368, 369, 370; 74/105, 522

[56] References Cited
U.S. PATENT DOCUMENTS

| | | | |
|---|---|---|---|
| 2,973,818 | 3/1961 | Marvin | 172/456 |
| 3,628,613 | 12/1971 | Kaufman | 172/311 |
| 3,797,580 | 3/1974 | Roth | 172/311 |
| 3,866,688 | 2/1975 | Hansen | 172/311 |
| 4,023,623 | 5/1977 | Anderson | 172/311 |
| 4,034,623 | 7/1977 | Boone et al. | 74/522 |
| 4,050,523 | 9/1977 | Poland | 172/456 X |
| 4,126,189 | 11/1978 | Channel | 172/456 |
| 4,178,998 | 12/1979 | Rockwell | 172/311 |
| 4,350,211 | 9/1982 | Coufal | 172/311 |
| 4,355,690 | 10/1982 | Jensen et al. | 172/311 |

Primary Examiner—Richard T. Stouffer
Assistant Examiner—William H. Honaker
Attorney, Agent, or Firm—Haverstock, Garrett & Roberts

[57] ABSTRACT

A folding toolbar adapted for attachment to a draft vehicle for carrying ground working tools, such as rotary hoe wheels, includes a main frame section and lateral wing sections pivotally connected to the main frame section for upward folding to transport positions. One of the wing sections is foldable through 180° to overlie the main frame section in relatively close proximity thereto, while the other wing section is pivotally connected to the main frame section through a pivot link arrangement and a power cylinder which enable 180° folding to overlie both the main frame section and the opposite first folded wing section. An auxiliary frame member is mounted is spaced relation on the main frame section and provides arrangement for mounting the wing folding cylinders so as to allow substantially the full length of the main frame to be used for mounting tools thereon.

12 Claims, 10 Drawing Figures

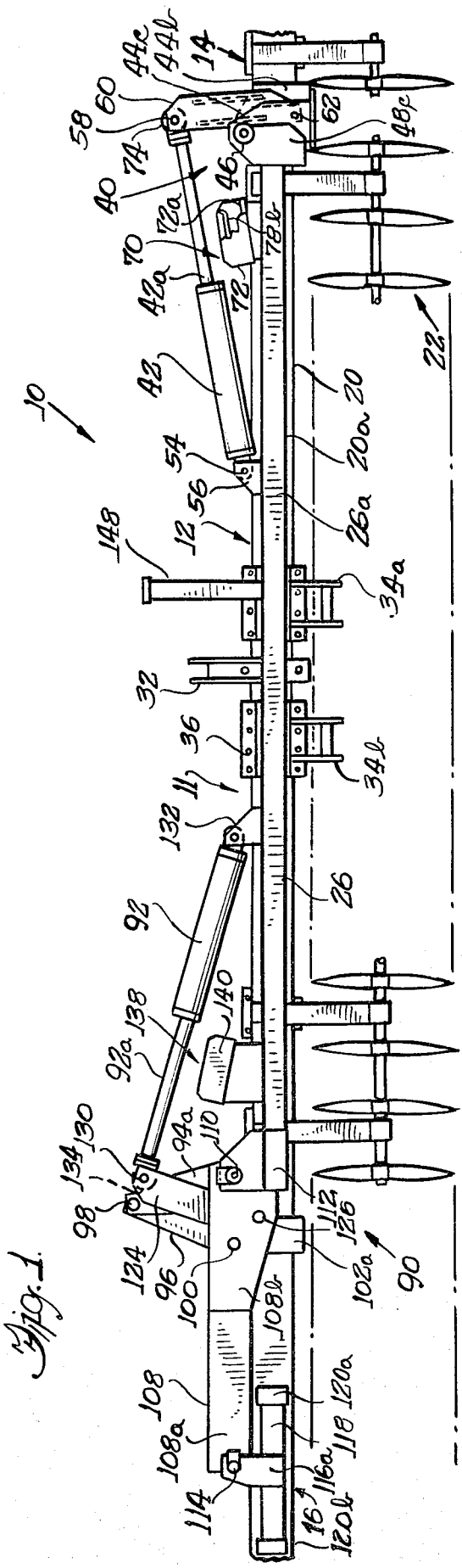
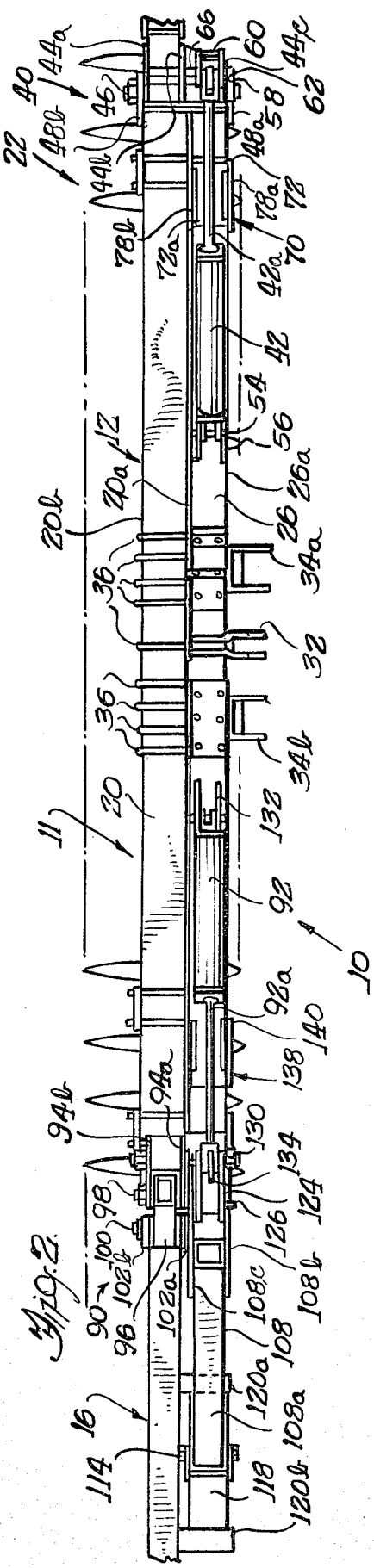

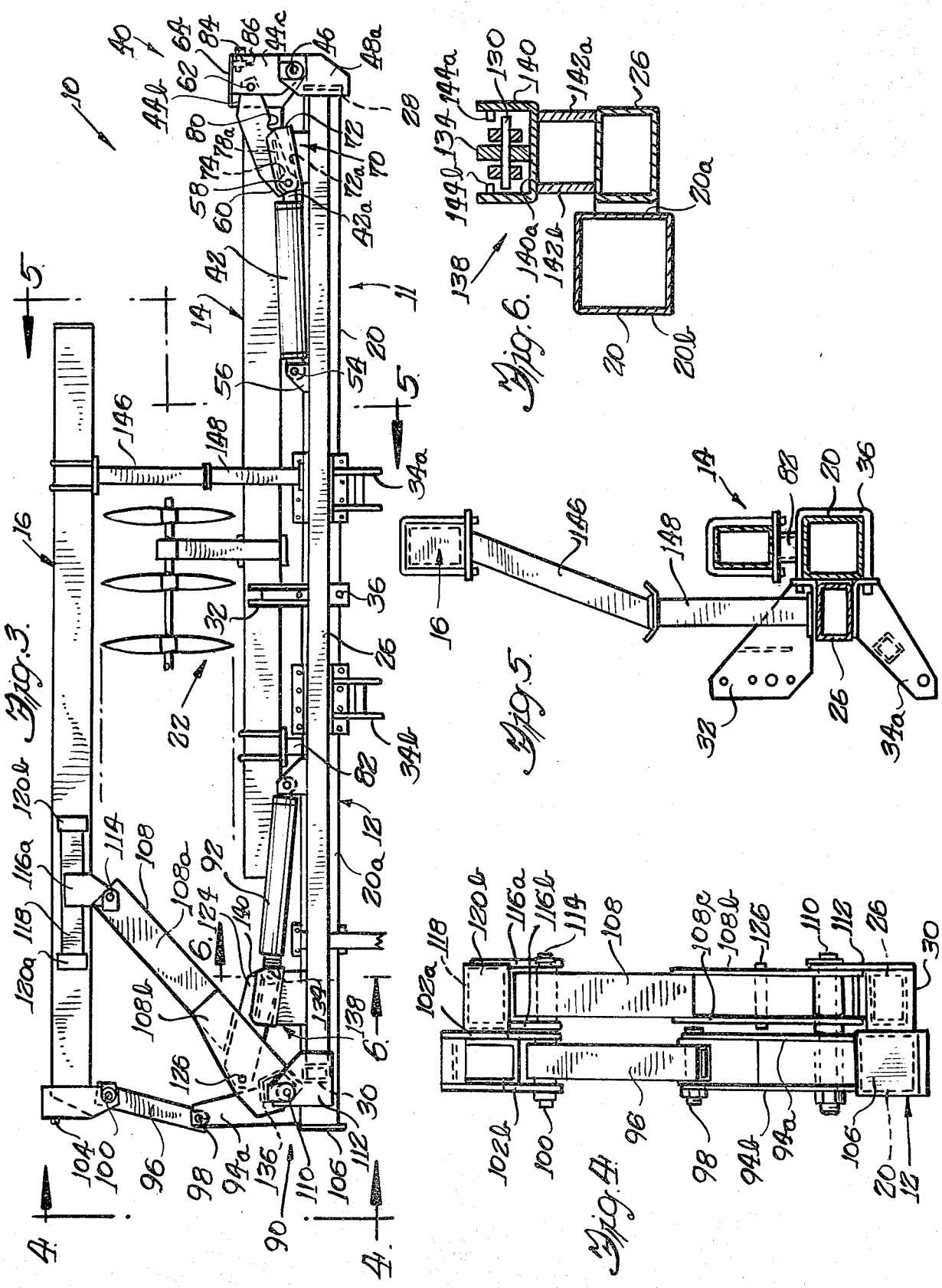

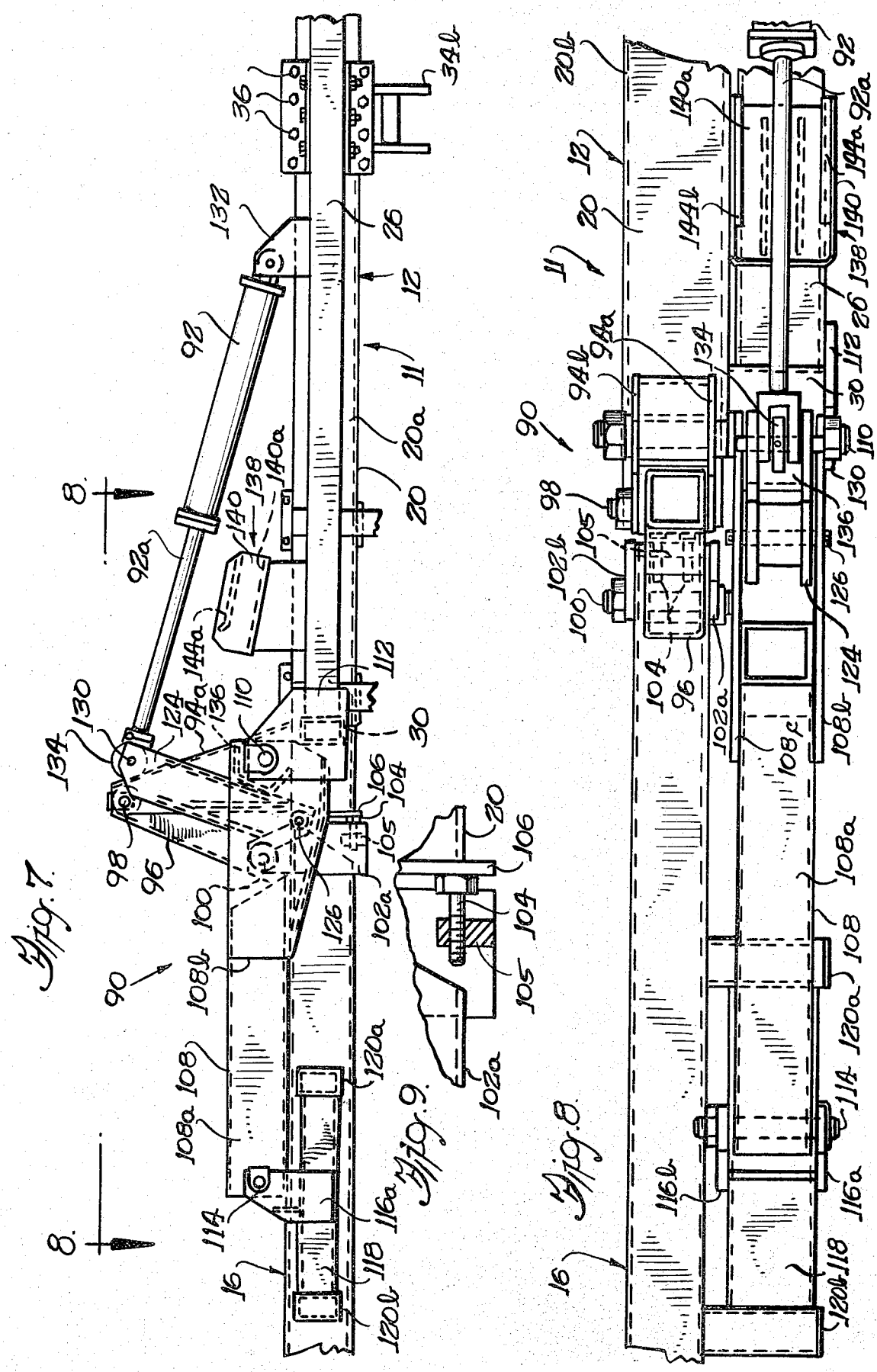

TOOLBAR WITH WINGS FOLDABLE SUBSTANTIALLY 180 DEGREES

The present invention relates generally to folding implement frames, and more particularly to a folding toolbar which includes a main frame section and lateral wing sections one of which is adapted for 180° folding to overlie the main frame section in close proximity thereto, and the other of which is connected to the main frame section through a novel hinge mechanism enabling 180° folding to substantially overlie the main frame section and the opposite folded wing section.

With the advent of relatively high horsepower draft vehicles such as tractors and the like capable of pulling relatively wide agricultural implements through fields for ground working, it has become a common practice to provide implement frames having folding wing sections which enable upward folding to reduce overall width for transport along highways and through conventional gate openings. Among the various agricultural implements employing folding wing sections are folding toolbars or tool carriers on which rotary hoe wheels, field cultivator spring teeth, planters and similar devices may be mounted.

As the operating widths of folding wing implements become greater, such as 30 to 40 feet or longer, the wing sections become greater in length relative to the main frame section so that, depending upon the lengths of the wing sections, it is not feasible to merely fold the wing sections to upstanding positions because the resulting height of the folded implement creates potential interference with low hanging tree branches and the like during transport. This problem is alleviated in accordance with the present invention by providing a toolbar in which the wing sections have lengths greater than one-half the length of the main frame section but which are adapted for substantially 180° folding without interference with each other or any ground working tools carried by the wing sections.

A general object of the present invention is to provide a novel folding toolbar which enables the wing sections to be folded substantially 180° relative to a main frame section with one of the wing sections overlying the main frame section in relatively close proximity thereto and the other wing section overlying both the main frame section and the opposite folded wing section without interfering therewith.

A more particular object of the present invention is to provide a folding toolbar having a main frame section and lateral wing sections each of which has a length greater than one-half the length of the main frame section and is pivotally connected to the main frame section for folding movement between a lowered operating position axially aligned with the main frame section and a 180° folded transport position, one of the wing sections being foldable by means of a fluid pressure cylinder to overlie the main frame section in relatively close relation thereto, and the other wing section being connected to the main frame section through novel hinge connection means including a pair of pivot links, one of which is connected through a control link to a fluid pressure cylinder operative to effect 180° folding to a position overlying the main frame section and the opposite folded wing section in spaced relation thereabove so as not to interfere with any ground working tools carried by the first folded wing section.

Another object of the present invention is to provide a toolbar having a main frame section and wing sections foldable from lowered extended operating positions to 180° folded positions through fluid pressure cylinders, the cylinders being mounted on an auxiliary frame member which is mounted on the main frame section in parallel spaced relation thereon so as to enable mounting of tools along substantially the full length of the main frame section.

A feature of the foldable tool bar in accordance with the present invention lies in the provision of a novel pair of pivot links pivotally interconnecting one of the wing sections to the main frame section, one of the pivot links having cooperative association with a control link and fluid pressure cylinder operative to move the associated wing section between its lowered and raised positions.

Another feature of the folding toolbar in accordance with the present invention lies in the provision of guide means on the auxiliary frame member which cooperate with the fluid pressure cylinders to effect controlled lowering of the wing sections when passing from substantially vertical positions to fully folded positions overlying the main frame.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a fragmentary front elevational view of a folding toolbar constructed in accordance with the present invention, portions being broken away for clarity;

FIG. 2 is a plan view of the folding toolbar illustrated in FIG. 1;

FIG. 3 is a front elevational view of the folding toolbar shown in FIG. 1, but showing the wing sections in fully folded positions;

FIG. 4 is an end view, on an enlarged scale, taken substantially along line 4—4 of FIG. 3, looking in the direction of the arrows;

FIG. 5 is a sectional view, on an enlarged scale, taken substantially along line 5—5 of FIG. 3, looking in the direction of the arrows;

FIG. 6 is a transverse sectional view, on an enlarged scale, taken substantially along line 6—6 of FIG. 3, looking in the direction of the arrows;

FIG. 7 is a fragmentary elevational view illustrating the hinge and actuating mechanism for the left-hand wing section shown in FIG. 1 but on an enlarged scale;

FIG. 8 is a plan view of the structure of FIG. 7, taken along line 8—8 of FIG. 7;

FIG. 9 is a fragmentary detail view, on an enlarged scale, showing the adjustable stop as employed on the wing sections.

Figure 10:
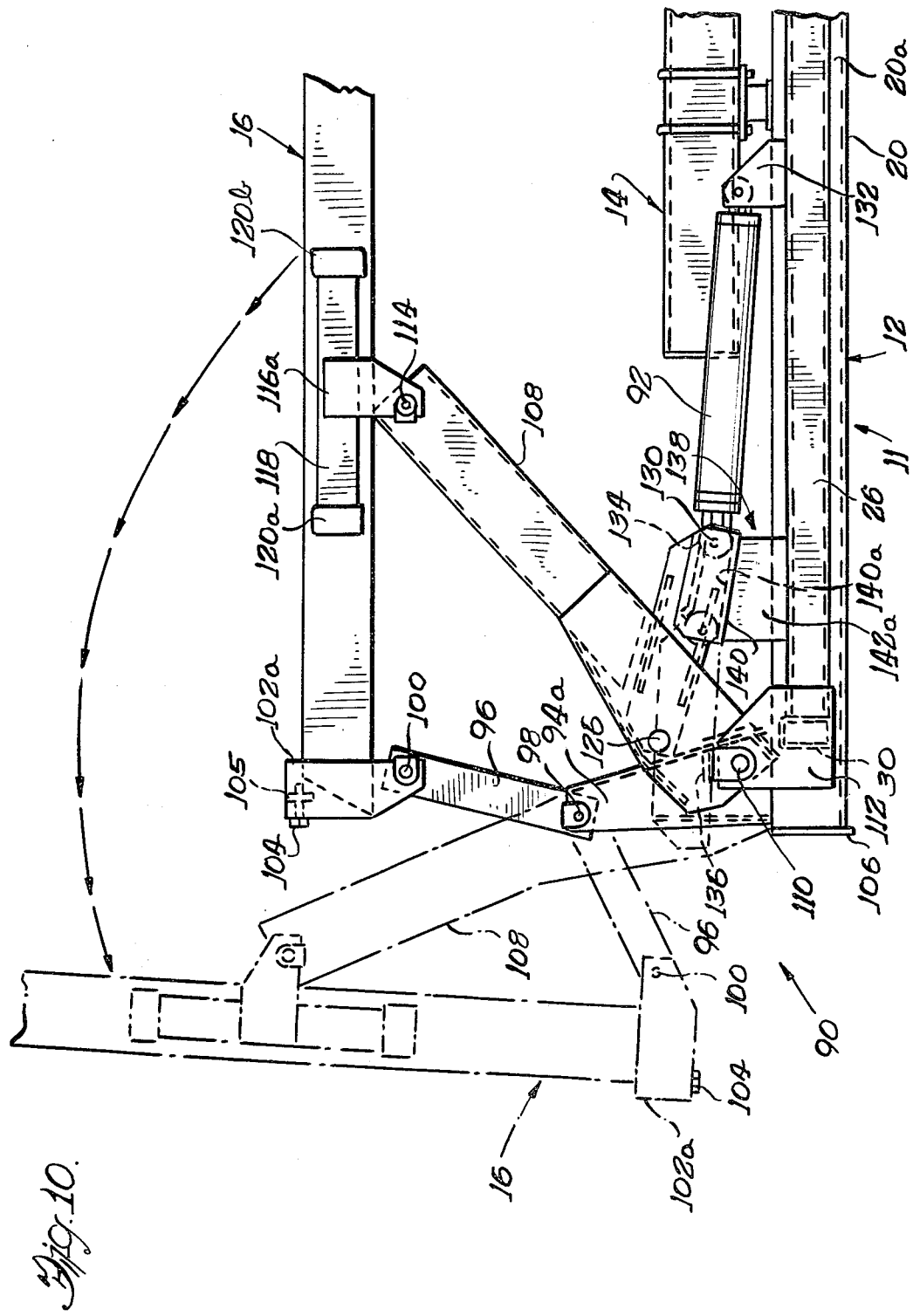
FIG. 10 is a fragmentary elevational view of the hinge and actuating mechanism of FIGS. 7 and 8 but with the wing section being shown in a fully folded position in full lines and in an intermediate position in phantom.

Referring now to the drawings, and in particular to FIGS. 1-3, the present invention is illustrated, by way of example, as being embodied in an agricultural implement in the form of a rotary hoe indicated generally at 10. The rotary hoe includes a folding toolbar which is constructed in accordance with the invention and is indicated generally at 11. The folding toolbar 11, which in a broader sense may be termed a foldable frame assembly, includes a main frame section, indicated generally at 12, and lateral wing frame sections, indicated generally at 14 and 16, each of which is pivotally connected to the main frame section for folding movement between a first lowered working or operating position substantially axially aligned with the main frame section and a second raised or folded position wherein the wing section is folded substantially 180° about its pivot connection to the main frame section so as to overlie the main frame section for transport or storage.

In the illustrated embodiment, the main frame section 12 includes a generally rectangular tubular frame member 20, termed the main frame member, having forward and rearward side surfaces 20a and 20b, respectively, the forward side surface being the side of the main frame member facing in the direction of normal movement of the toolbar during operation. The wing sections 14 and 16 may also comprise rectangular tubular frame members which may be of slightly smaller width, considered in the plan view of FIG. 2, than the main frame member 20. Ground working tools, such as individually mounted or gang mounted rotary hoe wheels indicated at 22, may be mounted along the main frame member 20 and along the wing sections. It will be understood that other types of ground working tools, such as field cultivator shank mounted teeth, may be mounted on the main frame and wing sections of toolbar 11, as is known. Similarly, it is possible to mount planter assemblies along the main frame section and wing sections. As will become apparent hereinbelow, a feature of the present invention lies in the ability to mount ground working tools along the substantial lengths of the main frame and wing sections while employing externally mounted fluid pressure operated actuating cylinders to fold and unfold the wing sections.

As will be discussed more fully hereinbelow, the main frame section also includes an auxiliary frame member 26 in the form of an elongated tubular frame member which is of generally rectangular transverse configuration and is mounted on the main frame member 20 in parallel relation thereto through a mounting plate 28 at its right-hand end, as viewed in FIG. 3, and a rectangular tubular mounting member 30 at its left-hand end. The frame member 26 is mounted parallel to and spaced forwardly from the forward side surface 20a of frame member 20 sufficiently to enable mounting of ground working tool support brackets on and along substantially the full length of the frame member 20.

The folding toolbar 11 is adapted for mounting on a draft vehicle such as a tractor or the like. For this purpose, the main frame section 12 of the toolbar has a centrally located upwardly extending hitch bracket 32 (FIGS. 1, 2 and 5) and a pair of downwardly extending hitch brackets 34a and 34b equally spaced on laterally opposite sides of the central hitch bracket 32 which facilitate mounting of the toolbar on a conventional three-point or quick coupler hitch mounted on the draft vehicle in a conventional manner. The central hitch bracket 32 is mounted directly on the main frame member 20 and auxiliary frame member 26 through bolts passing through the auxiliary frame member and by a U-shaped bolt 36 secured about the main frame member 20. The hitch brackets 34a, b are similarly mounted on the main and auxiliary frame members 20 and 26 through mounting bolts extending through the auxiliary frame and U-shaped bolts 36 extending about the frame member 20.

The wing section 14 is pivotally connected to the main frame section 12 through hinge connection means, termed the first hinge connected means indicated generally at 40, and is operatively interconnected to the main frame section through operator means in the form of a fluid pressure operated double acting cylinder 42 adapted to enable folding movement of the wing section 14. The hinge connection 40 includes a pair of upstanding hinge plates 44a and 44b which are fixed to opposite sides of the tubular wing section 14 and are pivotally connected through a pivot or hinge pin or bolt 46 to a pair of upstanding hinge plates 48a and 48b fixed, respectively, to the forward facing side surface 26a of auxiliary frame member 26 and the rear side surface 20b of main frame member 20.

The fluid pressure cylinder 42 overlies the auxiliary frame member 26 and has its cylinder end pivotally connected thereto through a pivot pin 54 and upstanding bracket plates 56. The cylinder 42 is of conventional design and has an extendable piston rod 42a the outer end of which is connected through a pivot pin 58 to one end of a control link 60. The end of the control link 60 opposite its pivotal connection 58 is pivotally connected through a pivot pin 62 to and between the hinge plate 44a and a hinge plate 44c which is connected to the hinge plates 44a, b through a connecting plate 64 so that the hinge plates 44a, b and c lie in parallel spaced relation to each other. As shown in FIG. 2, the hinge pin 46 extends through axially aligned openings in the hinge plates 44a, b and c and 48a, b, while the pivot pin 62 is parallel to hinge pin 46 and extends through axially aligned openings in the outer end of the pivot link 60 and through axially aligned bores through the hinge plates 44a, b and c. A spacer sleeve 66 is coaxially mounted on hinge pin 62 and maintains the pivot link 60 against the hinge plate 44c so that the pivot link 60 is coplanar with the longitudinal axis of the operating cylinder 42.

Guide means, indicated generally at 70, in the form of a generally U-shaped channel member 72 is mounted on the auxiliary frame member 26 so that its open side faces upwardly. The guide means 70 defines an inclined ramp surface 72a positioned to receive and support a roller 74 rotatably mounted on the pivot pin 58 as the wing section 14 passes over-center or through a plane containing the pivot axis 46 and normal to the longitudinal axis of the main frame section 12. In this manner, the wing section is prevented from free fall after is passes through or over vertical center and is lowered to its fully folded position overlying the frame member 20 of the main frame section 12 upon retraction of the piston rod 42a. Preferably, a pair of laterally opposed limit or guide bars 78a and 78b are fixed to the inner surfaces of the upstanding walls of the U-shaped channel 72, and the pivot pin 58 is made of a length to extend outwardly from either side of the pivot link 60 so that the ends of pin 58 are received beneath the guide bars as the roller 74 engages and traverses the ramp surface 72a. In this manner, should the toolbar be subjected to an upward jolting force as the wing section 14 passes over-center toward its folded position, the pivotal connection of cylinder rods 42a to pivot link 60, as defined by pivot pin 58, will not rise upwardly above a straight line connecting the pivotal axes 54 and 62 so as to prevent desired controlled lowering of the wing section to its folded position.

The fluid pressure operated double acting cylinder or ram 42 is connected to a suitable source of fluid pressure, such as a hydraulic pump on the associated draft vehicle, through fluid pressure lines (not shown) connecting the fluid pressure source to the piston and rod ends of the cylinder through a control valve enabling extension and retraction of the piston rod 42a, as is known. With the wing section 14 in its lowered operating position, as shown in FIG. 1, retraction of the piston rod 42a causes the pivot link 60 to fulcrum about the pivot pin 46 and cause a corresponding upward pivotal lifting of the wing section toward its upward folded position. Preferably, the pivot link 60 has recesses 80 formed in its parallel side plates which engage the pivot pin 46 and effect a pivotal fulcrum action as the wing section is raised and lowered relative to the main frame. Continued retraction of the piston rod 40 during upward folding of the wing section 14 causes the roller 74 to engage the inclined ramp surface 72a as the wing section passes over center. At this point, controlling fluid pressure release from the piston end of cylinder 74 controls the rate of descent of the wing section to its fully folded 180° position.

Preferably, a stop member 82 is mounted on the wing section 14 to engage the upper surface of the main frame member 20 so as to maintain the folded wing section in parallel relation with the main frame when in its fully folded position, as shown in FIG. 3.

When it is desired to lower the wing section 14 to its extended operating position, fluid pressure is applied to the piston end of the cylinder 42 so as to extend the piston rod 42a through the guide means 70 and move the control link 60 outwardly in a manner to raise the wing section upwardly about its pivot axis 46. The geometry of the pivot link 60 in relation to its pivotal connection 62 to the outer wing section 14 and the wing pivot axis 46 is such that the recesses 80 in the pivot link 60 engage the pivot pin 46 at substantially the moment the wing section passes outwardly through a vertical plane normal to the longitudinal axis of the main frame 12 and containing the pivot axis 46, at which time a relatively fixed relation between the pivot link 60 and the pivot plate 44a, b and c is establish. At this point, controlled release of fluid pressure from the rod end of the cylinder 42 effects controlled lowering of the wing section 14.

As shown in FIG. 3, a pair of stop bolts, one of which is indicated at 84, are suitably threadedly mounted on a transverse support block 86 fixed to and between the pivot plates 44a, b so that the heads of the stop bolts are positioned to engage the transverse plate 28 when the wing section 14 is in its lowered extended position. The stop bolts are adjustable to selectively vary the downward operating position of the wing section 14 relative to the main frame section 12 but do not interfere with pivotal floating of the wing section to follow the ground contour during ground working.

As aforementioned, the wing section 16 is pivotally mounted on the main frame section 12 for movement from a lowered operating position axially aligned with the main frame section to an upwardly folded position overlying the main frame and the opposite folded wing section 14 in spaced relation thereabove so as not to interfere with any ground working tools carried by the folded wing section 14. To this end, the wing section 16 is connected to the main frame section through hinge connection means, termed second hinge connecting means, indicated generally at 90. The hinge connecting means 90 has operative association with operator means in the form of a fluid pressure operated double acting cylinder or ram 92 which is selectively operable to move the wing section 16 between its lowered operating position and its raised transport position folded substantially 180° from its lowered position so as to overlie the main frame section and the underlying opposite folded wing section 14.

The second hinge connection means 90 includes a pair of upstanding parallel hinge plates 94a and 94b fixed on the left-hand end of the main frame member 20. A first pivot link 96 is pivotally connected at one end to the main frame section 12 through a pivot pin 98 mounted on and between the upper ends of the hinge plates 94a, b so that the pivot pin 98 establishes a first pivot axis spaced above and lying in a plane transverse to the longitudinal axis of the main frame. The end of the pivot link 96 opposite its pivotal connection 98 is pivotally connected through a pivot pin 100 to and between a pair of hinge plates 102a and 102b fixed to the forward and rear side surfaces of the end of the rectangular tubular wing section 16 adjacent the main frame section. The pivot pin 100 defines a second pivot axis parallel to the pivot axis 98.

A pair of stop bolts 104 are threadedly mounted on a transverse mounting plate 105 fixed between hinge plates 102a, b so that the stop bolts engage a transverse plate 106 fixed to the adjacent end of the main frame member 20 and limit downward movement of the wing section 16. The stop bolts 104 are adjustable to enable selective variation of the lowered position of the wing section 16 relative to the main frame in similar fashion to the aforedescribed stop bolts 84 carried by the pivot plates 44a, b on the wing section 14.

A second fixed length pivot link 108 which includes a rectangular tubular portion 108a and a pair of parallel end plates 108b and c, is pivotally connected at one end to the main frame section 12 and auxiliary frame member 26 through a pivot pin 110 so that the longitudinal axis of pivot link 108 lies in a plane normal to pivot pin 110 and containing the longitudinal axis of frame member 26. Pivot pin 110 is mounted in suitable aligned openings in the pivot plates 94a, b and a pivot plate 112 fixed in upstanding relation on the left-hand end of the auxiliary frame member 26, as viewed in FIGS. 7 and 8. The pivot pin 110 defines a third pivot axis parallel to and spaced from the first pivot axis defined by pivot pin 98.

The end of pivot link 108 opposite its pivot connection 110 to the main frame section 12 is pivotally connected to the wind section 16 through a pivot pin 114 mounted between a pair of mounting plates 116a and 116b fixed on opposite sides of a rectangular tubular member 118 mounted in parallel outwardly spaced relation on the wing section 16 through mounting members 120a and 120b. The pivot pin 114 defines a fourth pivot axis which is parallel to and spaced from the pivot axis defined by pivot pin 100.

The pivot links 96 and 108 are of predetermined length, link 108 being longer than link 96, such that they form with the hinge plates 94a, b and the length of the wing section 16 between the pivot axes 100 and 114 a trapezium when considered with the wing section 16 in its upwardly folded position as in FIG. 3.

The operator means which includes the fluid pressure cylinder or ram 92 also includes a control link 124 having one end pivotally connected through a pivot pin 126 to and between the end plates 108b, c of pivot link 108. The control link 124 is generally similar to the aforedescribed control link 60 and is pivotally connected at its end opposite the pivot pin 126 to the outer end of the extendable piston rod 92a of the cylinder 92 through a pivot pin 130. The cylinder 92 is pivotally mounted on auxiliary frame member 26 through bracket plates 132. The pivot pin 130 also rotatably supports a roller 134 in similar fashion to the aforedescribed roller 74. The pivot pin 126 defines a fifth pivot axis spaced intermediate the ends of the second pivot link 108 and parallel to the pivot axes 98 and 110.

A generally U-shaped stop member 136 is mounted between and transverse to the end plates 108b, c of pivot link 108 generally adjacent the pivot pin 110, as illustrated in FIGS. 7, 8 and 10. The length of the control link 124, considered between its pivot axes 126 and 130, the location of its pivotal connection 126 to the control link 108 and the position of stop member 136 are such that the control link 124 abuts the stop member 136 when the wing section 16 is pivoted between its lowered extended position and a substantially vertical position normal to the axis of main frame section 12. In this manner, the control link 124 is maintained in substantially fixed relation to the pivot link 108 throughout movement of the wing section 16 between its lowered operating position and a position extending upwardly substantially normal to the axis of the main frame section 12.

Guide means, indicated generally at 138, are mounted on the auxiliary frame member 26 for cooperation with the pivotal connection between the cylinder rod 92a and control link 124 so as to facilitate controlled lowering of the outer wing section 16 from an upstanding position normal to the main frame section to its fully folded position overlying the main frame 12 during a folding operation. The guide means 138 is generally similar to the aforedescribed guide means 72 and includes a U-shaped channel member 140 mounted in an inclined position on the auxiliary frame member 26 through parallel support plates 142a and b, as best seen in FIG. 6, so as to define an upwardly inclined ramp surface 140a positioned to receive the roller 134 thereon at substantially the point at which the wing section 16 is moving toward the main frame and passes through a position extending upwardly at approximately a 90° angle relative to the main frame section 12, i.e., at the point at which the wing section 16 passes through or overcenter during upward folding. Preferably, a pair of guide or limit bars 144a and 144b are mounted in opposed relation within the U-shaped channel 140 similar to the aforedescribed guide bars 78a, b so that axial outward extensions of the pivot pin 130 are disposed below the guide bars 144a, b at all times during movement of the outer wing section 16 between its aforementioned upstanding position and its fully folded position overlying the main frame 12.

The fluid pressure cylinder or ram 92 has its piston and rod ends connected to a source of fluid pressure, such as a suitable hydraulic pump carried on an associated draft vehicle, in circuit with a control valve enabling the operator to extend or retract the piston rod 92a in similar fashion to cylinder 42. Assuming the wing section 16 to be in its lowered operating position and that the operator desires to raise or fold the wing section 16 following initial folding of the opposite wing section 14 to its fully folded position overlying the main frame 12, the operator pressurizes the rod end of the cylinder 92 so as to retract the piston rod 92a. Because the control link 124 is in fixed relation to the pivot link 108 due to engagement with the stop member 136, retraction of the piston rod 92a effects upward pivotal movement of the pivot link 108 about its pivot axis 110 and causes a corresponding upward pivotal movement of the control link 96 about its pivot axis 98.

When the wing section 16 reaches a position disposed approximately 90° to the axis of the main frame section 12, as shown by the phantom position in FIG. 10, the wing section 16 starts to pass through center and the guide roller 134 engages the ramp surface 140a. At this time, continued retraction of the piston rod 92a causes the control link 124 to disengage from the stop member 136 and, through controlled exhaust of fluid pressure from the piston end of the cylinder 92, effect selective continued pivotal folding of the outer wing section 16 to its fully folded position as shown in FIG. 3 wherein the pivot links 96 and 108 maintain the wing section 16 in upwardly spaced parallel relation to the main frame 12 and opposite folded wing section 14 and the ground working tools 22 carried thereon.

Preferably, a support leg 146 is suitably mounted on the wing section 16 for engagement with an upstanding support leg 148 mounted on the frame member 26 of the main frame section 12 to assist in supporting the wing section 16 and any ground working tools carried thereon when in its fully upwardly folded position, as best seen in FIGS. 3 and 5.

When it is desired to lower the wing sections 14 and 16 from their upper folded positions overlying the main frame 12, the wing section 16 is first lowered through pressurizing the piston end of cylinder 92 to raise wing section 16 to its upward center position after which it passes over-center in a downward direction by controlling fluid pressure exhaust from the rod end of cylinder 92 which effects controlled lowering of the wing section 16 to its lowered operating position. When the outer wing section 16 has been raised sufficiently, such as to a generally vertical position normal to the axis of the main frame section, the operator may energize the fluid pressure cylinder or ram 40 to effect raising and downward folding of the opposite wing section 14 as previously described.

While a preferred embodiment of the present invention has been illustrated and described, it will be understood that changes and modifications may be made therein without departing from the invention in its broader aspects. Various features of the invention are defined in the following claims.

What is claimed is:

1. A foldable toolbar comprising:
a main frame section and a pair of wing sections each of which has a length greater than one-half the length of said main frame,
first hinge connection means pivotally connecting one of said wing sections to said main frame section so as to enable folding movement of said one wing section between a lowered position generally longitudinally aligned with the main frame section and a raised position folded substantially 180° to overlie said main frame section in relatively close proximity thereto,
first operator means interconnected between said main frame section and said one of said wing sections and operable to effect movement of said one of said wing sections between its said lowered and raised positions,
second hinge connection means pivotally connecting the other of said wing sections to said main frame section so as to enable folding movement of said other wing section between a lowered position generally longitudinally aligned with said main frame section and a raised position folded substantially 180° to overlie said main frame section and said one of said wing sections when in its said raised position, said second hinge connection means including a first pivot link pivotally connected at one end to said main frame section so as to define a first pivot axis spaced from the longitudinal axis of said main frame section, said first pivot link being pivotally connected at its opposite end to said other of said wing sections so as to define a second pivot axis parallel to and spaced from said first pivot axis, a second pivot link pivotally connected at one end to said main frame section so as to define a third pivot axis parallel to and spaced from said first pivot axis, said second pivot link being pivotally connected at its opposite end to said other of said wing sections so as to define a fourth pivot axis parallel to and spaced from said second pivot axis, said first and second pivot links being cooperative to move said other of said wing sections between its said lowered and raised positions upon pivotal movement of said second pivot link through a predetermined arc about said third pivot axis, and second operator means interconnected between said main frame section and said other of said wing sections and operable to effect movement of said other wing section between its said lowered and raised position, said second operator means being operatively associated with said second pivot link and selectively operable to move said second pivot link through said predetermined arc.

2. A foldable toolbar as defined in claim 1 wherein said second pivot link is greater in length than said first pivot link.

3. A foldable toolbar as defined in claim 1 wherein said second operator means includes a control link pivotally connected to said second pivot link so as to define a fifth pivot axis spaced intermediate the ends of said second pivot link, and an actuating cylinder interconnecting said control link to said main frame section and operative to effect movement of said control link so as to move said second pivot link through said predetermined arc.

4. A foldable toolbar as defined in claim 3 wherein said actuating cylinder comprises a fluid pressure operated cylinder having one end pivotally connected to said main frame section and having its opposite end pivotally connected to said control link.

5. A foldable toolbar as defined in claim 3 including a stop mounted on said second pivot link, said control link being connected to said second pivot link so as to be engaged by said stop to maintain said second pivot link and said control link in substantially fixed relation to each other during movement of said other of said wing sections between its said lowered position and an upstanding position wherein the longitudinal axis of said other wing section is substantially normal to the longitudinal axis of said main frame section.

6. A foldable toolbar as defined in claim 5 including guide means mounted on said main frame section and cooperative with said control link so as to control the direction of movement of said control link during movement of said other wing section between said upstanding position and its fully folded position.

7. A foldable toolbar as defined in claim 1 wherein said main frame section includes at least one upstanding hinge plate at the end thereof adjacent said other of said wing sections, said first pivot link being pivotally connected to said hinge plate so that said first pivot axis lies above the longitudinal axis of said main frame section, said second pivot axis being spaced longitudinally outwardly along said other wing section from said first pivot axis when said other wing section is in its lowered position.

8. A foldable toolbar as defined in claim 1 including guide means adapted for cooperative association with each of said wing sections and the associated operator means so as to assist in controlled lowering of said wing section from positions substantially normal to the longitudinal axis of said main frame section to their said fully folded positions.

9. A foldable toolbar as defined in claim 1 wherein said first and second operator means each includes an operating cylinder, said main frame section including a main frame member and an auxiliary frame member, said auxiliary frame member being mounted on said main frame member in side-by-side parallel spaced relation, said operating cylinders being pivotally mounted at first ends on said auxiliary frame member and having opposite ends interconnected to their respective wing sections so as to enable movement of said wing sections between their said lowered and raised positions.

10. A foldable toolbar as defined in claim 9 including guide means mounted on said auxiliary frame members and cooperative with said operating cylinders to effect controlled movement of said wing sections from their said lowered to their said folded positions.

11. In a foldable frame assembly having a main frame section and lateral wing sections each of which is pivotally connected to the main frame section for folding movement between a first working position substantially longitudinally aligned with the main frame section and a second folded position raised substantially 180° about its pivot connection to said main frame section so as to overlie said main frame section, one of said wing sections being foldable to lie in relatively close proximity to said main frame section when in its folded position, and the other of said wing sections being foldable to overlie said main frame section and said one of said wing sections when in its folded position, the improvement comprising;

hinge mechanism means interconnecting said other of said wing sections to said main frame section including a first link pivotally connected at one end to said main frame section at a first pivot axis spaced from the longitudinal axis of said main frame section and pivotally connected at its opposite end to said other of said wing sections at a second pivot axis spaced from and parallel to said first pivot axis, a second link pivotally connected at one end to said main frame section at a third pivot axis parallel to and spaced from said first pivot axis, and pivotally connected at its opposite end to said other of said wing sections at a fourth pivot axis parallel to and spaced from said second pivot axis, said first and second links being cooperative to move said other of said wing sections from a position generally longitudinally aligned with said main frame section to a position overlying said main frame section and said one of said wing sections when in its folded position upon movement of said second link through a predetermined pivotal arc about said third pivot axis, and operator means operatively associated with said second link and operative to move said second link through said predetermined pivotal arc.

12. A foldable frame assembly as defined in claim 11 wherein said operator means comprises a fluid pressure cylinder pivotally connected to said main frame section, and a control link pivotally connected at one end to said second link intermediate its length and pivotally connected at its opposite end to said cylinder.

* * * * *